United States Patent [19]

Keck

[11] Patent Number: 4,704,151
[45] Date of Patent: Nov. 3, 1987

[54] METHOD FOR DRAWING FIBER OPTIC COUPLER

[75] Inventor: Donald B. Keck, Big Flats, N.Y.

[73] Assignee: Corning Glass Works, Corning, N.Y.

[21] Appl. No.: 765,653

[22] Filed: Aug. 15, 1985

[51] Int. Cl.⁴ .................... C03B 23/20; C03B 37/10; C03B 19/09

[52] U.S. Cl. ........................................ 65/4.1; 65/4.2; 65/18.4; 65/162; 65/163

[58] Field of Search ................ 65/3.12, 4.1, 4.2, 4.21, 65/61, 105, 112, 18.4, 162, 163

[56] References Cited

U.S. PATENT DOCUMENTS 4,083,625 4/1978 Hudson ............................ 350/96.15
4,497,643 2/1985 Kowata .............................. 65/4.21
4,551,162 11/1985 Hicks, Jr. ........................... 65/4.21
4,561,871 12/1965 Berkey ................................. 65/61

Primary Examiner—S. Leon Bashore
Assistant Examiner—Michael K. Boyer
Attorney, Agent, or Firm—W. J. Simmons, Jr.

[57] ABSTRACT

A low loss fiber optic coupler is fabricated by forming a coupler preform having a plurality of spaced glass cores extending longitudinally through a matrix of glass having a refractive index lower than that of the cores. The coupler preform is heated and stretched by first pulling means to form a glass rod which is drawn by second pulling means past an intermittant source of localized heat. When the localized heat source is turned on, the second pulling means draws the rod downwardly at a rate faster than the first pulling means. Since the rod is softened by the localized heat source, a necked-down coupling region is formed. The rod is severed to form a plurality of coupler units. When an end of a unit is immersed in acid, the matrix glass dissolves, thereby leaving the unit cores and surrounding etch-resistant cladding glass protruding from the newly formed endface of the unit.

5 Claims, 11 Drawing Figures

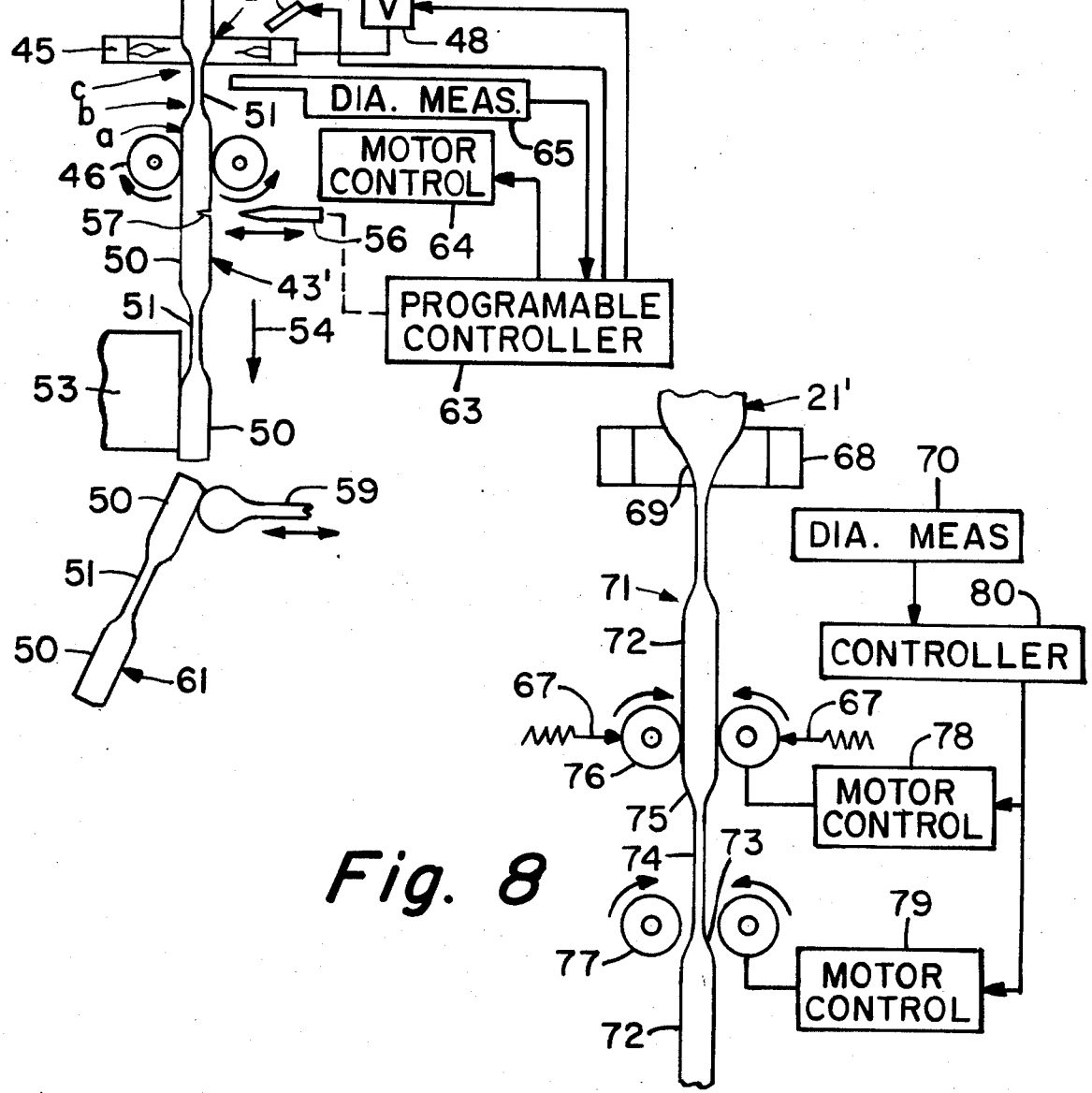

METHOD FOR DRAWING FIBER OPTIC COUPLER

CROSS-REFERENCE TO RELATED APPLICATION

This application is related to U.S. patent application Ser. No. 765,652 entitled "Method of Making Low Loss Fiber Optic Coupler" (D. B. Keck et al.), Ser. No. 765,655 entitled "Fiber Optic Coupler and Method" (G. E. Berkey) and Ser. No. 765,654 entitled "Optical Fiber-Device Interconnection and Method" (C. W. Deneka et al.), all filed on even date herewith.

BACKGROUND OF THE INVENTION

The present invention relates to fiber optic couplers and more particularly to a low-cost method of making fiber optic couplers.

Certain types of fiber optic systems require couplers in which at least a portion of the light propagating in one fiber is coupled to one or more other fibers.

It has been known that coupling occurs between two closely spaced cores in a multiple core device. The coupling efficiency increases with decreasing core separation and, in the case of single-mode cores, with decreasing core diameter. There have been developed a number of couplers that are based on these principles.

Multimode and single-mode couplers have been formed by positioning a plurality of fibers side-by-side along a suitable length thereof and fusing the claddings together to secure the fibers and reduce the spacings between the cores. Coupling can be enhanced by stretching and rotating the fibers along the fused length thereof as taught in U.S. Pat. No. 4,426,215. Also, a portion of the cladding is sometimes removed by etching or grinding to decrease the intercore distance as taught in U.S. Pat. No. 4,449,781. These processes are labor intensive and do not always result in the formation of couplers exhibiting predetermined coupling characteristics. This latter mentioned disdvantage is particularly apparent in the manufacture of certain single-mode couplers wherein the coupling core sections are to remain linear.

Said copending Keck et al. Application teaches a method wherein there is initially provided a coupler preform having a plurality of spaced glass cores extending through a matrix of glass having a refractive index lower than that of the glass cores. The coupler preform is heated and stretched to form a glass rod which is severed into a plurality of units. Heat is applied to the central region of each unit while the ends are pulled to elongate and taper inwardly the heated central region thereof. Various techniques are taught for providing the coupler with interconnection fibers.

SUMMARY OF THE INVENTION

It is therefore an object of the present invention to provide a low cost method of producing optical couplers. A further object is to provide a method which eliminates the piecemeal operation of necking down the central region of optical couplers.

The present invention pertains to a method of fabricating a fiber optic coupler comprising the following steps. There is initially provided a coupler preform having a plurality of spaced glass cores extending longitudingly through a matrix of glass having a refractive index lower than that of the glass cores. There is drawn from the preform a rod having alternate regions of predetermined large diameter and predetermined small diameter. The glass cores are of such a diameter and intercore spacing in the small diameter regions that they are suitable for the coupling of light from one core to another. However, the glass cores in the large diameter regions have such diameters and intercore spacings that they are unsuitable for the coupling of light from one core to another. The rod is severed to form individual coupler units.

In accordance with one embodiment of the invention, the step of drawing comprises heating one end of the preform and pulling from the heated end a preliminary rod of substantially uniform diameter equal to the diameter of the large diameter sections by passing the preliminary rod through first pulling means which pulls the rod at a first rate. The method further comprises passing the preliminary rod through second pulling means and intermittently heating the preliminary rod as it passes between the first and second pulling means. The second pulling means pulls the rod at the same rate as the first pulling means when the rod is not being heated as it passes between the first and second pulling means, the second pulling means pulling the rod at a rate greater than that of the first pulling means when the rod is being heated as it passes between the first and second pulling means.

In accordance with a further embodiment of the invention, the step of drawing comprises heating one end of the preform, pulling a rod from the end of the preform, and varying the rate at which the rod is pulled. The step of varying the rate at which the rod is pulled may comprise passing the rod through a single pulling means that is programmed to vary the rate at which the rod is being drawn. Alternatively, there may be employed at least two pulling means which are spaced along the rod such that one of the pulling means is always in contact with a large diameter region of the rod.

BRIEF DESCRIPTION OF THE DRAWINGS

FIG. 6 is a schematic illustration of an apparatus for forming coupler units from a coupler preform.

FIG. 7 is a cross-sectional view taken along lines 7—7 of FIG. 6.

FIG. 8 is a schematic illustration of an alternative apparatus for forming coupler units from a coupler preform.

DESCRIPTION OF THE PREFERRED EMBODIMENT

It is to be noted that the drawings are illustrative and symbolic of the invention, and there is no intention to indicate scale or relative proportions of the elements shown therein.

In accordance with the method of the present invention there is provided a coupler preform comprising a plurality of parallel cores extending along the longitudinal axis of a boule of matrix glass. A preferred method of forming the coupler preform is disclosed in the aforementioned Berkey application. There is initially provided an elongated boule having an axial bore therethrough. The boule, which consists of a glass that is relatively easily dissolved in a given solvent, may be formed by any suitable technique such as vapor deposition, melting or the like. If the boule is formed by melting or by some other technique that forms a solid glass body, a hole is drilled therethrough along the longitudinal axis. The rough surface caused by drilling should be smoothed prior to further processing.

Figure 1:
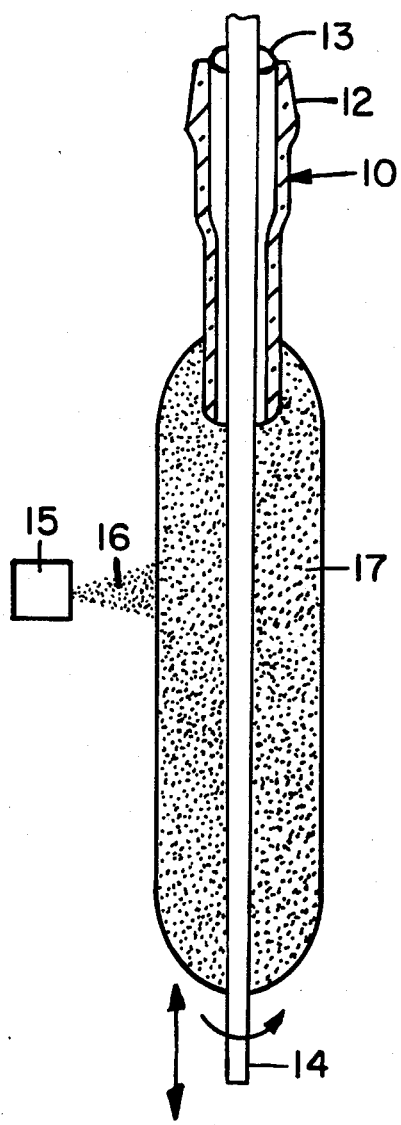
FIG. 1 illustrates the application of a coating of glass soot to a mandrel.

A preferred method of forming the elongated boule is shown in FIG. 1. A handle 10 of the type disclosed in U.S. Pat. No. 4,289,522 may be employed. Handle 10 is a tubular member having a ground glass joint 12 at one end thereof. The large diameter end of a tapered mandrel 14 extends through handle 10 and is secured thereto by shims 13. The ends of the mandrel are mounted in a lathe where it is rotated and translated as indicated by the arrows. The mandrel may be initially coated with carbon soot to facilitate removal of the glass soot preform deposited thereon. A gas-vapor mixture is oxidized within the flame of burner 15 to form a glass soot stream 16 which is directed toward mandrel 14. One or more auxiliary burners (not shown) may be employed to direct a flame toward one or both ends of the soot preform during deposition to prevent breakage. While mandrel 14 is rotated and translated with respect to burner 15, a plurality of layers of soot are deposited thereon to form soot preform 17.

After deposition of particulate soot material to the extent required to form soot preform 17, mandrel 14 may be removed from the assembly by pulling it out through handle 10, thereby leaving a longitudinal aperture.

Figure 2:
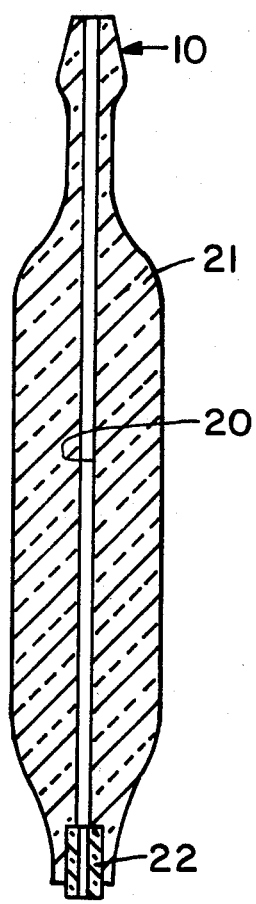
FIG. 2 is a cross-sectional view of a consolidated boule.

The ground glass joint portion of handle 10 is secured into a complimentary femal ground glass joint member, whereby gas such as helium may be flowed through the handle, the preform aperture and the preform interstices just prior to and during the consolidation of the preform. Since the end of the soot preform aperture opposite the handle tends to close during consolidation, a short section of silica capillary tubing 22 is inserted therein. Since the silica tubing is more viscous than the preform glass, the tubing aperture remains open at consolidation temperature as shown in FIG. 2. The remainder of aperture 20 of boule 21 naturally remains open.

Gas phase etching can be employed to smooth the surface of aperture 20. This can be accomplished by flowing a fluorine-containing gas such as $C_2F_6$, $SF_6$ or the like through the aperture.

Figure 3:
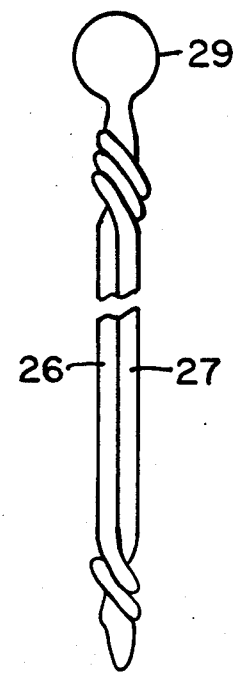
FIG. 3 shows an assembly of coated optical fiber preform rods.

A plurality of optical fiber preforms are made by any suitable process such as outside vapor deposition (see for example U.S. Pat. Nos. 4,486,212 and 4,224,046). The fiber preforms comprise a glass core surrounded by a layer of cladding glass having a refractive index lowe than that of the core. The cladding glass consists of a glass which is relatively resistant to dissolving in the given solvent. These optical fiber preforms possess core and cladding radii such that they could be drawn into single-mode or multimode optical fibers, whichever is desired in the resultant coupler. The optical fiber preforms are overclad or coated with a glass that is readily dissolved in the given solvent. The fiber preforms may be stretched prior to overcladding. The overcladding glass can be applied by a soot deposition technique such as that illustrated in FIG. 1, after which the composite article is consolidated and optionally stretched to reduce the diameter thereof. The elongated rod is severed into sections, each of which constitutes a coated fiber preform having a length about equal to that of boule 21. In FIG. 3, two such coated fiber preform rods 26 and 27 are stacked together in side-by-side fashion, and both ends of the stack are heated, twisted and stretched to ensure that the rods are secured together. One end of the stack is heated to form a knob 29 having a diameter slightly larger than that of aperture 20 of boule 21.

The fused rods 26 and 27 are inserted into the top of boule 21 of FIG. 2. Knob 29 suspends the rods from the top of boule 21 as shown in FIG. 4.

Figure 5:
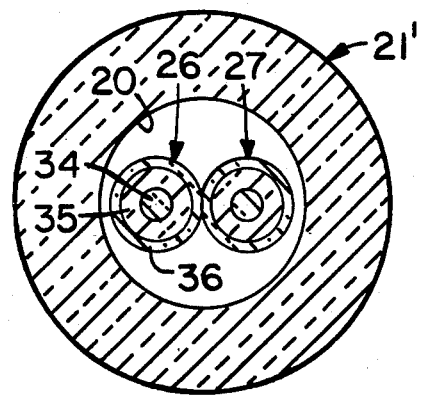
FIG. 5 is a cross-sectional view of a coupler preform taken perpendicular to the axis thereof.

Coated fiber preforms 26, 27 and 28 are shown in greater detail in the enlarged cross-sectional view of FIG. 5. A slight gap may exist between rods 26 and 27 and the wall of aperture 20 in order that the rods can be easily inserted therein. Each coated fiber preform rod comprises a core 34, a cladding 35 that is resistant to dissolving in the given solvent, and an outer coating 36 of glass that is readily dissolved in the solvent.

Figure 4:
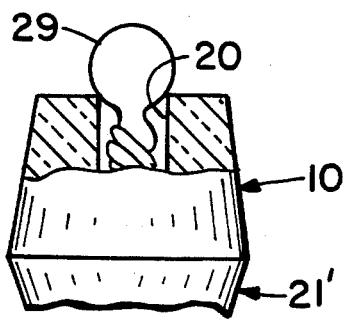
FIG. 4 is a partial cross-sectional view of the handle end of a coupler preform.

The stretching of the composite of FIGS. 4 and 5 into an elongated multicore coupling rod is schematically illustrated in FIG. 6. Preform 21 is drawn or stretched by tractors 40 in furnace 41 to form multicore coupler rod 43. Vacuum connection 44 may be affixed to the ground glass joint on handle 10. Rod 43 passes through ring burner 45 and is engaged by a second set of tractors 46, the rotational velocity of which varies in accordance with a predetermined program. Gas and oxygen are fed from source 47 through valve 48. Burner 45 can be ignited by electrical igniting means 49. Thus, burner 45 can be turned on and off instantaneously.

A conventional draw furnace may be employed to draw rod 43. The rate of rotation of tractors 40 is controlled such that the diameter of rod 43 is maintained substantially constant at the maximum diameter of the resultant coupler. For example, the diameter of large diameter portion 50 is the same as that of rod 43. Portion 50 is formed by turning off valve 48 so that burner 45 is extinguished. During the time that portion 50 is being formed, tractors 46 rotate at the same speed as tractors 40.

Necked-down region 51 is formed as follows. When point a is adjacent burner 45, valve 48 opens and ignition means 49 ignites a flame. The rotation of tractors 46 is accelerated, thereby causing that portion of rod 43 within burner 45 to become thinner. Acceleration of the rotation of tractors 46 continues until point b is adjacent the burner, thus forming a transition region. For example, the change in draw rate at tractors 46 may be linear in order to form a conical taper at the transition regions. The rotational velocity of tractors 46 remains constant until point c is adjacent burner 45. Necked-down region 51 is thus formed. Thereafter, the velocity of tractors 46 decreases until point d is adjacent burner 45, at which time the burner is extinguished and tractors 46 are again rotating at the same speed as tractors 40.

The various operations to be performed during the formation of necked-down region 51 can be controlled by programmable controller 63. Thus, igniting means 49, valve 48 and motor speed control 64 can all be controlled by controller 63. Moreover, to ensure that the diameter of region 51 is maintained within predetermined limits, a diameter measurement device 65 may be located just below burner 45. The signal from device 65 can be coupled to controller 63 so that appropriate adjustment can be made to the signal therefrom which is fed to motor control 64.

Tractors 46 may be spring loaded so that they follow the contour of the necked-down regions as well as the large diameter regions. Alternatively, tractors 46 may be spaced a predetermined fixed distance so that they engage only large diameter regions. In this later embodiment the length of large diameter region 50 must be at lest as great as that of necked-down region 51 plus the transistion regions to enable tractors 46 to engage the large diameter region during formation of the necked-down and transition regions.

Means such as vertical table 53 restrains necked-down rod 43' devating in a given direction from a vertical orientation as it moves downwardly in the direction of arrow 54. A hardened blade 56 moves toward rod 43', scores the midpoint of large diameter portion 50, and then retracts. Scoring can be carried out just below tractors 46 which thus function to prevent horizontal movement of rod 43' when it is contacted by blade 56. Alternatively, table 53 could be extended to a position adjacent blade 56. When score line 57 reaches the end of table 53, hammer 59 impacts rod 43' just below the score line, thereby breaking a coupler unit 61 from the rod. Other suitable means such as a laser can be employed to thermally shock the scored rod to cause it to break or to burn through an unscored rod. Means such as a moving belt having a cushioned surface may be employed to catch the falling units.

Rod 43 is shown in cross-section in FIG. 7. The fiber preforms become elongated to form optical waveguides 26' and 27', each comprising an elongated glass core surrounded by a layer of cladding glass. The glass from coatings 36 combines to form glassy region 38 that fills any open spaces which had existed between the coated fiber preform rods and matrix glass 21. The adjacent region of matrix glass 21 is pulled inwardly by the vacuum against glassy region 38. If the glass of region 38 is softer than that which forms the claddings of optical waveguides 26' and 27', region 38 will tend to deform as the matrix glass 21 squeezes inwardly during the stretching operation so that the shape of the harder glass optical waveguides 26' and 27 is not distorted. Matrix glass 21' and region 38 are both formed of glass which is easily dissolved in a given solvent. Region 38 and matrix glass 21 may be formed of the same glass composition, or region 38 may be formed of a glass having a refractive index greater than that of matrix glass 21. The boundary between these two glasses is represented by line 37.

As taught in the aforementioned Berkey application the combination of the boule of matrix glass and coated fiber preform rods can be drawn or stretched at a slightly lower temperature and without vaccum to form a coupler rod in which the interstices are not completely eliminated. For example, if high silica content glasses are employed, a draw temperature of about 1950° C. or higher will allow the interstices to be closed during the stretching operation. However, if the draw temperature is about 1850° C., the tension will be such that interstices remain in the region where the optical waveguides abut one another. It is obvious that the temperatures needed to form a rod with or without interstices depends upon the composition of the matrix glass and of the glass with which the optical fiber perform rods are coated. Whereas the coupler of FIG. 7 comprises only two fibers, a greater number of fibers may be employed.

The device 61 thus formed can function as an optical waveguide coupler since light propagating in one core will couple to the other cores in necked down region 51 where the cores are brought closer together and have reduced diameters. Away from necked down region 51, light does not couple from one core to the other since the cores are separated by a distance greater than the coupling distance.

If the unit being necked down in burner 45 contains interstices, those interstices are eliminated in the coupling zone during the neck down operation.

Another embodiment of a coupler forming apparatus is illustrated in FIG. 8. This embodiment omits burner 45 of FIG. 6. Preform 21' is situated in a furnace 68 having a relatively short hot zone such that preform root 69 is relatively steep. A steep root is preferred for drawing a rod having wide diameter variations. The output signal from diameter measurement device 70, which is located just below furnace 68, is coupled to programmable controller 80. A controller output signal is fed to tractor means for controlling the draw rate of rod 71. Rod 71 is drawn at a relatively slow rate to form large diameter portions 72. The speed at which the rod is drawn may be linearly increased to a relatively fast rate to form transition region 73; the draw rate remains at the relatively fast rate to draw necked-down region 74. The draw rate then decreases to form transistion region 75, the draw rate remaining relatively constant to form large diameter portions 72. Individual units can be severed from the multi-diameter rod 71 as described in conjunction with FIG. 6.

The draw means illustrated in FIG. 8 comprises first and second sets of tractors 76 and 77, respectively, which are controlled by motor speed controllers 78 and 79, respectively. The length of a large diameter portion 72 is greater than the sum of the lengths of necked-down region 74 and transition regions 73 and 75. Tractors 76 and 77 are so situated along rod 71 that one of the sets of tractors is always in contact with the large diameter portion of the rod. In this embodiment, when a set of tractors is adjacent to a necked-down or transition region, it merely "floats over" that region while the other set of tractors pulls the rod at the appropriate rate.

Various modifications of the embodiment of FIG. 8 could be employed. If a single set of tractors 76 were employed, they should be spring loaded as indicated by arrows 67 to ensure that they are in constant contact with rod 71. As the tractors move in a direction orthogonal to the axis of rod 71 during their travel along the transition regions 73 and 75, the rotational rate thereof would have to be adjusted in order to obtain the desired draw rate for rod 71.

Coupling may be further enhanced for certain types of couplers by rotating the preform during the drawing of at least a portion of the narrow diameter regions to introduce a twisting of the coupled cores. Also, diameter perterbations such as bulges in the coupling region can be introduced by appropriately modulating the rotational speed of the tractors.

Figure 9:
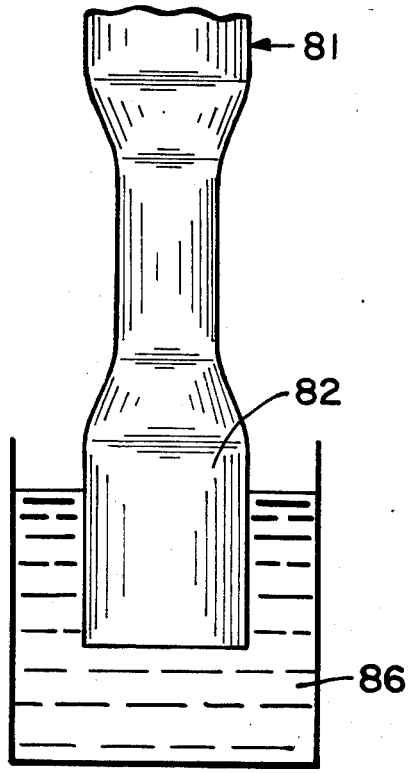
FIG. 9 illustrates an etching technique for removing a portion of the matrix glass to expose the ends of the fibers therein.
Figure 10:
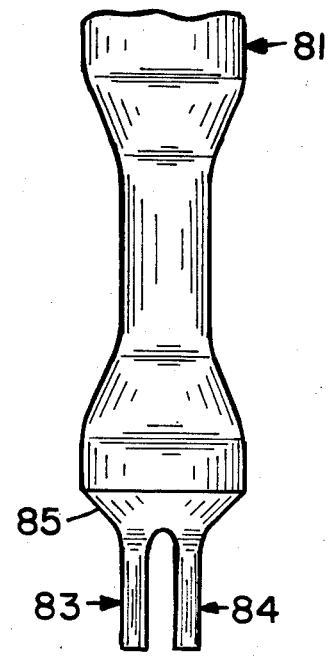
FIG. 10 shows a coupler unit after the etching treatment of FIG. 8.

FIG. 9 shows the immersion of an end of a necked-down two fiber unit 81 in a bath 86 of suitable solvent such as acid. The acid etches or dissolves matrix material 82, thereby leaving the fiber ends 83 and 84 protruding from endface 85 as shown in FIG. 10. If the unit being etched contains interstices, the total etching time is reduced by the flow of acid through the interstices. Without such interstices, etching proceeds radially inwardly from the outer surface of the unit, the last area to be etched being that between the fibers. The length of unit 81 must be sufficient to provide the desired length of protruding fibers 83 and 84. Since the length of unit 81 that is immersed in acid is much greater than the radius thereof, the acid etches radially inwardly to dissolve cladding material from fibers 83 and 84 before those fibers have been appreciably shortened by etching.

Figure 11:
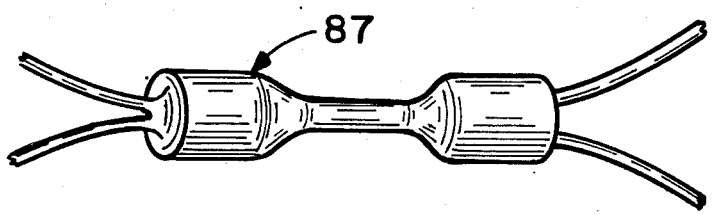
FIG. 11 is an oblique view of a coupler formed in accordance with the present invention.

The remaining end of unit 81 is then immersed in acid to expose the opposite ends of fibers 83 and 84 therein. A coupler 87 as shown in FIG. 11 is thus formed. The fibers protruding from the coupler can be fused to other fibers or fit into connector assemblies. The original diameter of the fiber preform rods of FIG. 3 and the size reduction that occurs in the stretching operation of FIG. 6 can be such that the fibers protruding from coupler 87 are the same diameter as the fibers that are to be connected thereto.

An optical coupler formed as described above may have the following dimensions. Large diameter portions 50 (FIG. 6) are 3 mm in diameter, and the diameter of necked-down region 51 is 0.75 mm. The length of necked-down region 51 is 5 cm, and the transition regions are about 1 cm long. The taper angle of both tapered regions is about 6°. Large diameter portions 50 are 12 cm long. After etching, fibers 73 and 74 (FIG. 10) are about 10 cm long.

A reflective star coupler can also be produced in accordance with the method of the present invention. Optical fibers protrude from only one end thereof. The opposite endface is ground and polished to a surface that is substantially perpendicular to the longitudinal axis of the coupler. A reflective surface such as a layer of silver is deposited on the polished endface. It is noted that the polished endface may be located on a large diameter region or a small diameter region. Thus, a star coupler may comprise a large diameter region, a transition region, and a small diameter region, the reflective surface being located on the end of the small diameter region. Alternatively, such a coupler can comprise two large diameter regions, two transition regions, and a small diameter region, the reflective surface being on the end of a large diameter region.

The refractive index of the matrix material should be equal to or less than that of the fiber cladding. Referring to FIG. 5, fiber cladding 35 could consist of pure fused silica, whereas boule 21 and coatings 36 can consist of $SiO_2$ doped with a plurality of oxides which render the resultant glass more easily dissolved than silica, said plurlity of oxides combining to provide a refractive index equal to or less than that of silica. Suitable combinations of oxides are $SiO_2$-$B_2O_3$-$GeO_2$ and $SiO_2$-$B_2O_3$-$TiO_2$. Both of these ternary glasses are more readily attacked by HF acid than silica. By way of example, a suitable composition for matching the refractive index of $SiO_2$ is 11 wt. % $B_2O_3$, 6.1 wt. % $GeO_2$ and 82.9 wt. % $SiO_2$.

Couplers have been made in which the thickness of the etchable glass between coupler fibers was about 10 $\mu$m. Some minimum thickness of etchable glass between fibers is desirable for the purpose of promoting flow of the etching solution between the fibers in order to separate them as fast as possible. However, it is noted that it is also desirable to maintain the fibers in a very close relationship to promote coupling.

It is noted that the light attenuation properties of the glasses from which a coupler is constructed are not as critical as are the properties of glasses from which long lengths of fibers are made since the coupling distance may be only about 60 mm and the thickness of glassy region 48 between fibers may be as small as 2 $\mu$m in the coupling region.

Whereas the etching of a single coupler unit has been described hereinabove, a plurality of units could be simultaneously etched in the same bath for more economic production.

It should be understood that the method of the present invention can be used to make single-mode or multi-mode couplers. The refractive index profiles of the cores within the coupler may be the same as the profiles of the fibers that are to be connected to the coupler. Most multimode fibers have an a-value of about 2.0 to optimize bandwidth. The a-values of the coupler cores might be between about 2 and 10 to enhance coupling and minimize splicing loss.

I claim:

1. A method of forming a fiber optic coupler comprising the steps of
   providing a coupler preform having a plurality of spaced glass cores extending longitudinally through a matrix of glass having a refractive index lower than that of said glass cores,
   drawing from said preform a rod having alternate regions of predetermined large diameter and predetermined small diameter that is smaller than said large diameter, said glass cores being of such a diameter and intercore spacing in said small diameter regions that light propagating in one of said cores will couple to an adjacent core said glass cores in said large diameter regions having such diameters and intercore spacings that substantially none of the light propagating in one of said cores couples to an adjacent core and
   severing said rod along the large diameter regions thereof to form coupler units, wherein the step of drawing comprises heating one end of said preform, pulling a rod from the end of said preform, and varying the rate at which said rod is pulled.

2. A method in accordance with claim 1 wherein the step of severing comprises scoring said rod and impacting said rod adjacent the point of scoring to break a coupler unit from said rod.

3. A method in accordance with claim 1 wherein the step of pulling comprises passing said rod through a single set of draw tractors which are spring loaded so that they continually contact said rod, and varying the rotational rate of said tractors.

4. A method in accordance with claim 1 wherein the step of pulling comprises passing said rod through at least two sets of draw tractors, said sets of draw tractors being spaced along said rod such that one of said sets of tractors is always in contact with a large diameter region of said rod.

5. A method of forming a fiber optic coupler comprising the steps of providing a coupler preform having a plurality of spaced glass cores extending longitudinally through a matrix of glass having a refractive index lower than that of said glass cores, drawing from said preform a rod having alternate regions of predetermined large diameter and predetermined small diameter that is smaller than said large diameter, said glass cores being of such a diameter and intercore spacing in said small diameter regions that light propagating in one of said cores will couple to an adjacent core, said glass cores in said large diameter regions having such diameters and intercore spacings that subsantially none of the light propagating in one of said cores couples to an adjacent core and severing said rod along the large diameter regions thereof form coupler units, wherein the step of drawing comprises heating one end of said preform, pulling from the heated end of said preform a preliminary rod of substantially uniform diameter equal to the diameter of said large diameter sections by pulling said preliminary rod at a first rate at a first location, and intermittently heating said preliminary rod as it passes between said first and second locations, said rod being pulled at said second location at the same rate as it is pulled at said first location when said rod is not being heated as it passes between said first and second locations, said rod being pulled at said second location at a rate greater than that at which it is pulled at said first location when said rod is being heated as it passes between said first and second locations.

* * * * *